United States Patent Office 2,942,016
Patented June 21, 1960

2,942,016

HYDROCARBON ZINC SULFATE AND SULFONATE COMPOUNDS

Gene C. Robinson and Joseph R. Zietz, Jr., Baton Rouge, La., assignors to Ethyl Corporation, New York, N.Y., a corporation of Delaware No Drawing. Filed July 30, 1958, Ser. No. 751,827

9 Claims. (Cl. 260—429.9)

The present invention is concerned with novel compositions and a process for their preparation, particularly hydrocarbon zinc sulfate and sulfonate compounds.

It has been known for many years to produce compounds in which zinc is linked to a carbon atom. The procedures employed have been primarily of academic interest, that is they are useful only for laboratory purposes. For example alkylzinc compounds, e.g. alkylzinc halides, have been prepared by reacting an alkyl halide with zinc dust. This procedure is the most efficient process developed to date for formation of alkylzinc compounds. It is, however, not employed in a commercial sense because of its inherent disadvantages, e.g. the high cost of the alkyl iodides or bromides which are necessary for the reactions. The procedure can be adjusted to result in the formation of dialkylzinc compounds.

A more efficient and practical process for the synthesis of organozinc compounds, particularly one readily adaptable to economical commercial operation, has not heretofore been provided. Further, the preparation of hydrocarbon zinc sulfate or sulfonate compounds in which zinc is linked to a carbon atom and an oxygen atom of the sulfate or hydrocarbonsulfonate anion has not been accomplished up to the present time. In addition, techniques commonly used to synthesize other organometallic compounds are not applicable to the preparation of such hydrocarbon zinc sulfate and sulfonate compounds.

It is therefore an object of this invention to provide novel compositions of matter and a process for their manufacture. Another object is to provide an economical and efficient process for the preparation of hydrocarbon zinc sulfates and sulfonates. A specific object is to provide new hydrocarbon zinc compounds and a process for their manufacture. Other objects and advantages will be apparent from the following description and appended claims.

The above and other objects of this invention are accomplished by providing novel hydrocarbon zinc sulfate and sulfonate compounds. Such compounds are characterized in having a hydrocarbon radical linked to zinc through a carbon atom and the zinc is linked to oxygen of the sulfate or hydrocarbon sulfonate anion. In another sense, the compounds of this invention can be considered as derivatives of sulfuric acid wherein one hydrogen atom is replaced by a hydrocarbon zinc radical wherein the zinc is linked to the carbon of the hydrocarbon radical and to oxygen of the sulfate cation and the other hydrogen atom is replaced by a hydrocarbon radical and derivatives of hydrocarbonsulfonic acids wherein the hydrogen atom is replaced by a hydrocarbon zinc radical. The hydrocarbon portions of these novel compounds are preferably alkyl. Thus, the particularly preferred compositions comprise the alkylzinc alkyl sulfates or sulfonates wherein each alkyl group is hydrocarbon and contains up to and including about 6 carbon atoms. The novel products are produced by the reaction of a hydrocarbon ester of sulfuric acid or hydrocarbon sulfonic acid with zinc in the presence of an organozinc compound. This reaction is preferably conducted at a temperature between about 50 to 150° C. In an especially preferred embodiment, dialkyl sulfates wherein the alkyl groups are hydrocarbon and contain up to and including about 6 carbon atoms are reacted with finely divided zinc in the presence of a catalytic amount of a dialkylzinc compound at a temperature between 50 to 150° C.

The present invention provides novel hydrocarbon zinc compounds and a method for their preparation. By this discovery the hydrocarbon zinc sulfate and sulfonate compounds have been prepared for the first time. Such compounds are of considerable utility particularly as alkylating agents. For such use they are more advantageous than previous organozinc and related compounds and more economical. In effect, they are produced in most cases by the comparatively economical materials which are basically an olefin such as ethylene, sulfuric acid or a sulfonic acid, zinc and a minor proportion of recoverable fully alkylated zinc compounds.

The novel compositions comprise hydrocarbon zinc sulfate and sulfonate compounds. More specifically, the compounds are such that a hydrocarbon radical is linked to zinc through a carbon atom and the zinc is also linked to an oxygen atom of the sulfate or sulfonate anion. The compounds can be depicted by the following formulae:

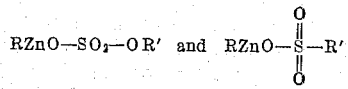

wherein R and R' can be the same or different and are hydrocarbon radicals having up to about 30 carbon atoms. Such radicals include both aliphatic and aromatic radicals. Included among such compounds are for example methylzinc methylsulfate, ethylzinc ethylsulfate, hexylzinc hexylsulfate, eicosylzinc eicosylsulfate, ethylzinc methylsulfate, hexylzinc methylsulfate, vinylzinc vinylsulfate, butenylzinc butenylsulfate, hexenylzinc hexenylsulfate, vinylzinc hexenylsulfate, ethynylzinc ethynylsulfate, phenylzinc phenylsulfate, benzylzinc benzylsulfate, naphthylzinc naphthylsulfate, cyclohexylzinc cyclohexylsulfate, cyclohexylzinc ethylsulfate, cyclohexenylzinc ethylsulfate, ethylzinc p-toluenesulfonate, methylzinc methanesulfonate, vinylzinc vinylsulfonate, phenylzinc benzenesulfonate, and the like. The hydrocarbon radicals in the aforementioned compounds can also be further substituted, e.g. forming branched chain hydrocarbon compounds. It is especially preferred that the hydrocarbon radicals be alkyl groups containing up to and including about 6 carbon atoms because of their greater utility, stability, reactivity, and economy. The sulfate compounds are preferred over the sulfonates because of their enhanced reactivity and stability.

The novel products of this invention are prepared by the reaction of hydrocarbon sulfate and sulfonate esters with zinc metal in the presence of a fully alkylated organozinc compound. The reaction is generally conducted at temperatures between about 0° C. to 250° C. but, of course, below the decomposition temperature of the products. The preferred operating temperature is between about 50 to 150° C. for best results. Below 50° C. slower reactions and reduced yields are obtained. Above 150° C. secondary reactions can take place and no particular advantage is achieved employing higher temperatures.

The hydrocarbon sulfate or sulfonate ester which is employed is an ester of sulfuric acid or a hydrocarbon sulfonic acid in which the hydrogen atoms have been substituted by hydrocarbon radicals. Such esters can be depicted by the following formulae.

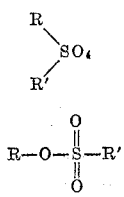

wherein R and R' can be the same or different and have the meaning described above. Typical examples of such esters include dimethyl sulfate, diethyl sulfate, dihexyl sulfate, dieicosyl sulfate, ethyl methyl sulfate, ethyl hexyl sulfate, divinyl sulfate, diethynyl sulfate, diphenyl sulfate, dibenzyl sulfate, dinaphthyl sulfate, dicyclohexyl sulfate, ethyl p-toluenesulfonate, ethyl ethansulfonate, phenyl benzenesulfonate, vinyl methanesulfonate and the like. The hydrocarbon alkyl sulfates, having up to and including about 6 carbon atoms in each alkyl group are preferred because of their greater availability, economy, and applicability to the process. Dimethyl and diethyl sulfate are especially preferred embodiments because of the superior results obtained when they are employed.

The zinc employed in the reaction can be in any form or particle size but reactions are most rapid where finely divided powder is employed. It likewise can be alloyed with other metals which are inert and do not hinder but may promote the reaction, as for example copper, silver, cadmium, mercury, chromium, and the like. It is preferred to employ the zinc in a powdered or finely divided form, e.g. less than about ⅛″ major dimension and preferably below 1000 microns in size. A particularly preferred size is between 50 to 1000 microns.

The organometallic zinc compound employed as a catalyst in the process is fully alkylated. In other words, the zinc is bonded only to carbon atoms of organo radicals. Typical examples of such organozinc compounds include aliphatic and aromatic compounds such as, dimethyl zinc, diethyl zinc, dihexyl zinc, dieicosyl zinc, dihexyl zinc, divinyl zinc, dibutenyl zinc, dihexenyl zinc, diethynyl zinc, diphenyl zinc, dibenzyl zinc, dinaphthyl zinc, dicyclobutyl zinc, dicyclohexyl zinc, dicyclohexenyl zinc, ethylmethyl zinc, hexylethyl zinc, cyclohexylmethyl zinc, phenylethyl zinc, and the like. It is to be understood that the organo radicals in the above zinc compounds can be further substituted as long as such substituents are essentially inert in the reaction. It is preferred however to employ hydrocarbon zinc compounds in which the hydrocarbon groups contain up to about 18 carbon atoms. The especially preferred organozinc compounds are those wherein the zinc is attached only to hydrocarbon alkyl groups having up to about 6 carbon atoms. In this connection diethyl zinc is an especially preferred compound because of its greater availability and good catalytic effect.

Accomplishment of the desired result is noted when minor amounts of the organometallic zinc compound are employed as about 0.001 part per part of the metallic zinc. Likewise excessive amounts as about 100 parts and higher per part by weight of the metallic zinc can be employed. Such excessive amounts are however not required and serve no particular beneficial effect although the excess is recoverable. In general, it is desirable to employ catalytic quantities of the organometallic zinc compound of the order between about 0.01 to 0.5 part per part by weight of the metallic zinc. In a particularly preferred embodiment between about 0.05 to 0.2 part of organozinc compound per part of metallic zinc are employed.

The process of this invention will be more fully understood from a consideration of the following examples. In the examples all parts are by weight unless otherwise specified.

*Example I*

To a reactor equipped with an agitator, condenser, means for adding reactants and means for maintaining a nitrogen flush was added 71.9 parts of powdered zinc of particle size less than ⅛″ while maintaining a nitrogen atmosphere. Then a mixture of diethyl sulfate, 77.1 parts, and 5 parts of diethyl zinc was added to the reaction vessel, the temperature raised to 118° C. and maintained at this temperature for about 1 hour. A solid granular material was evident in the reactor. The reaction mixture is slurried with isooctane and filtered in order to remove starting material and catalyst. The residue is extracted with 300-400 part portions of diethyl ether and filtered to remove excess zinc. Concentration of the extract gives 82 percent yield of $EtZnEtSO_4$ having 29.01 percent zinc, theory is 29.8 percent. On hydrolysis by alcohol and water the theoretical amount of ethane calculated for $EtZnOSO_2OEt$ is evolved.

*Example II*

The above example is repeated except that 5 parts of dimethyl zinc are employed in place of the diethyl zinc with the reaction temperature at 50° C. for 4 hours. Ethylzinc ethylsulfate is obtained in high yield.

*Example III*

Employing the procedure of Example I, 290 parts of di-n-hexyl sulfate are reacted with 130 parts of finely divided zinc in the presence of 10 parts of di-n-hexyl zinc at 150° C. for 3 hours. The product is recovered by extracting with diethyl ether and the solids remaining after removal of solvent comprise n-hexylzinc hexylsulfate in high yield.

*Example IV*

When diphenyl sulfate is reacted with metallic zinc at 100° C. in the presence of 0.1 part of diethyl zinc per part by weight of zinc for 6 hours and the product is extracted from the reaction mixture with benzene, phenylzinc phenylsulfate is obtained in high yield.

*Example V*

Reacting 29 parts of dicyclohexyl sulfate with 12 parts of zinc employing 0.2 part of diphenyl zinc as a catalyst at 190° C. for 30 minutes results in an essentially quantitative yield of cyclohexylzinc cyclohexylsulfate.

*Example VI*

When divinyl sulfate is substituted for diethyl sulfate in Example I, vinylzinc vinylsulfate is obtained in high yield.

*Example VII*

Dioctadecyl sulfate is reacted with finely divided zinc using dicyclohexylzinc as a catalyst at 140° C. for 8 hours. Octadecylzinc ocetadecylsulfate is obtained in high yield.

*Example VIII*

Example I is repeated with the exception that 200 parts of toluene are employed as a diluent in the reaction. In this manner the product is precipitated as rapidly as formed and is readily recovered by filtration at the completion of the reaction.

*Example IX*

Employing the procedure of Example I, except that ethyl p-toluenesulfonate is substituted for diethyl sulfate with the reaction at 100° C. for 3 hours, ethylzinc p-toluenesulfonate is produced.

*Example X*

Example II is repeated employing methyl methanesulfonate in place of diethyl sulfate to produce methylzinc methanesulfonate in high yield.

Example XI

When phenyl benzenesulfonate is reacted with zinc in the presence of a minor amount of diphenyl zinc at 150° C. for 2 hours, phenylzinc benzenesulfonate is obtained.

Example XII

Hexylzinc p-toluenesulfonate is obtained when hexyl p-toluenesulfonate is reacted with finely divided zinc in the presence of 0.2 part of diphenyl zinc per part of zinc at 125° C. for 3 hours.

Example XIII

When Example I is repeated employing ethylzinc ethanesulfonate in place of diethyl sulfate ethylzinc ethanesulfonate is obtained.

Example XIV

When propyl propanesulfonate is reacted with zinc in the presence of 0.25 part of dipropylzinc per part of zinc at 100° C. for 4 hours in di-n-butyl ether, propylzinc propanesulfonate is produced.

It is not intended that the invention be limited to the above illustrative examples either insofar as the process for the manufacture or the novel compositions of this invention are concerned. For example, in the above examples one can substitute dimethyl sulfate, dinaphthyl sulfate, diethynyl sulfate, ethyl methyl sulfate, vinyl ethanesulfonate, cyclohexyl p-toluene-sulfonate, benzyl benzenesulfonate, and the like for the sulfates and sulfonates employed therein and divinyl zinc, zinc acetylide, dicyclopropyl zinc, dibenzylzinc, dibutyl zinc, for the organo-zinc compound employed. Other examples will be evident.

The product produced is readily recoverable from the reaction mixture by first filtering and then distilling to remove the organozinc catalyst therefrom. It can also be readily recovered by filtering and extracting with a diluent in which the product is not soluble for example the hydrocarbons mentioned hereinafter. Other modes of recovery can also be employed.

The reaction is generally conducted at atmospheric pressure. However, if desired, subatmospheric and super atmospheric pressures up to as high as 150 atmospheres and higher can be used. Autogenous or super atmospheric pressure is advantageous when any of the constituents of the reaction mixture are volatile at the temperature employed. On the other hand, in these instances reflux conditions can also be employed which serves for better heat control, more intimate admixture and increased reaction rate. Utilization of a higher boiling inert solvent such as decalin, xylene, dodecane, and the like at reflux under atmospheric pressure also affords higher reaction temperatures.

The mode of addition of the reactants is not critical and can be varied. For example, any one of the constituents can be added to the reactor first and the others added in alternate sequence. A procedure which has been found most satisfactory, however, is to add the powdered zinc to the reactor and then add the sulfate or sulfonate containing the catalyst therein. Although solvents are not required such are generally employed when the sulfates, sulfonates, or organozinc compound is solid or insoluble in the reaction mixture. For such purposes the usual organic solvents can be employed with the general criteria being that they be essentially inert in the reaction and liquid under reaction conditions. Included among such solvents are the hydrocarbons, ethers, and tertiary amines. Typical examples of such solvents include the hexanes, octanes, nonanes, octadecanes, cyclohexanes, benzene, toluene, xylene, tetralin, decalin, and the like hydrocarbons which are essentially inert to the reactants and products. Among the tertiary amines which can be employed are included the tertiary, alkyl, aryl and cyclic amines. Typical examples of such amines include methylpyridine, amyldiphenylamine, p-isobutyldimethylaniline, triphenylamine, tricyclohexylamine, triethylamine, trimethylamine and the like. Included among such ethers are the non-aromatic, aromatic and the polyethers. The non-aromatic ethers include the aliphatic and mixed ethers. Typical examples of the aliphatic ethers included are di-n-butyl ether; di-sec-butyl ether; diisobutyl ether; di-n-amyl ether; di-n-heptyl ether; tetrahydrofuran; and the like saturated and unsaturated ethers. Examples of the mixed ethers which are employed are n-amylmethyl ether; tert-amylethyl ether; n-butyl-isopropyl ether; ethylisoamyl ether; n-butyl-n-propyl ether; and the like. The aromatic ethers include, for example, the diaromatic ethers, alkyl aryl ethers, and the alkaryl alkyl ethers. Typical examples of the diaromatic ethers include dibenzyl ether; diphenyl ether; dinaphthyl ether; and the like. When the aromatic ether is an alkyl aryl ether, we employ, for example, methylphenyl ether; methyl-o,m or p-tolyl ether; methyl-α-naphthyl ether; ethylphenyl ether; ethyl-o,m or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers which we employ can be, for example, benzylmethyl ether; benzylethyl ether; benzyl-n-butyl ether; and the like. Examples of the polyethers which are employed are those having the configuration

$$R-O-(CH_2)_n-O-R$$

wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Typical examples of ethers which are solid but can be employed by virtue of their solubility in particular reaction mixtures include ethers such as didodecyl ether, hexadecyl ether, octadecycleicosyl ether, ditetracosyl ether, o-diethoxy benzene, trimethylene glycol diphenyl ether, 4-methoxy diphenyl and the like. The aromatic hydrocarbons and polyethers are particularly preferred solvents because of their economy, greater availability and ready removal from the reaction system. The solvents are generally employed in amount between about 1 to 100 parts per part by weight of the zinc metal employed.

The proportions of the metallic zinc and hydrocarbon sulfate or sulfonate reactants employed can be varied over considerable latitude while still achieving the benefits of this invention. In general, however, between about ½ to 2 moles of zinc are employed per mole of the hydrocarbon sulfate or sulfonate. In a preferred embodiment between 0.75 to 1.25 moles of zinc per mole of hydrocarbon sulfate or sulfonate are employed. Conducting the reaction within this range of amounts of materials results in optimum yields with greatest economy.

The novel products of this invention are of considerable utility. For example, they can be employed as alkylating agents, that is, a source of hydrocarbon radicals which can be used for the formation of other organo-metallic compounds. They are also useful in electrolytic procedures as an electrolyte for producing other organo-metallic compounds. For example, the electrolysis of ethylzinc ethylsulfate at 50° C., a current density of about 0.2 amp. per square centimeter using a lead anode results in the formation of tetraethyllead. They are also useful in reaction with TiCl₄ for preparation of catalysts useful in the polymerization of olefins particularly α-olefins. In such use only minor proportions are required for polymerizations at about 100° C. and low pressures.

A particularly desirable use of the compounds of this invention is as an alkylating agent to produce organo-lead compounds. The following example will demonstrate a preferred embodiment of such use.

*Example XV*

Employing the reactor of Example I, 22.5 parts of the solid granular product of Example I, prior to extraction, 12.2 parts of anhydrous lead acetate and 45 parts of toluene were placed in the reactor. The mixture was agitated at reflux temperature for 1 hour and then cooled to room temperature. Then 10 parts of isopropyl alcohol were added to decompose any unreacted ethylzinc ethylsulfate. Analysis of the produce showed 1.96 parts tetraethyllead representing a yield of 50.5 percent.

Although the lead salts of organic acids are particularly preferred in the above use because of the superior results obtained, other lead compounds can also be employed, particularly the lead halides and the oxides and sulfides. Other uses of the compounds of this invention will be evident.

Particularly distinguishing characteristics of the compositions of this invention is that they do not spontaneously fume or ignite as do various dialkylzinc and alkylzinc halide compounds and they are highly stable.

Having thus described the novel compositions and the process by which they are prepared, it is not intended that the invention be limited except as set forth in the following claims.

We claim:
1. Compounds selected from the group consisting of hydrocarbon zinc sulfate and hydrocarbon zinc sulfonate compounds having only one carbon to zinc linkage and only one oxygen to zinc linkage.
2. Compositions having the formula RZnO—SO$_2$—OR' wherein R and R' are hydrocarbon radicals having up to about 6 carbon atoms.
3. Ethylzinc ethylsulfate.
4. Ethylzinc p-toluenesulfonate.
5. A process which comprises reacting a compound selected from the group consisting of a dihydrocarbon ester of sulfuric acid and a hydrocarbon ester of a hydrocarbon sulfonic acid with metallic zinc in the presence of and in contact with a fully alkylated hydrocarbon zinc compound.
6. The process of claim 5 which comprises reacting diethyl sulfate with metallic zinc in the presence of and in contact with diethyl zinc at a temperature between about 50 to 150° C.
7. The process of claim 5 which comprises reacting ethyl p-toluenesulfonate with metallic zinc in the presence of and in contact with diethyl zinc at a temperature between about 50 to 150° C.
8. The compounds of claim 1 wherein said hydrocarbon groups are alkyl groups containing up to and including about 6 carbon atoms.
9. The process of claim 5 wherein the hydrocarbon groups of said dihydrocarbon ester of sulfuric acid, said hydrocarbon ester of a hydrocarbon sulfonic acid, and said hydrocarbon zinc compound are alkyl groups containing up to and including about 6 carbon atoms.

References Cited in the file of this patent

FOREIGN PATENTS

| 584,196 | Great Britain | Jan. 9, 1947 |
| 603,616 | Great Britain | June 18, 1948 |